(12) United States Patent
Atarashi et al.

(10) Patent No.: US 8,540,042 B2
(45) Date of Patent: Sep. 24, 2013

(54) COOLING STRUCTURE FOR CONSTRUCTION MACHINE

(75) Inventors: Takayuki Atarashi, Tsuchiura (JP); Shuichi Terakado, Mito (JP); Shigehisa Funabashi, Naka (JP); Shinya Okumura, Kasumigaura (JP); Shigekazu Kieda, Ishioka (JP); Yasunori Ota, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/522,719

(22) PCT Filed: Jan. 7, 2011

(86) PCT No.: PCT/JP2011/050162
§ 371 (c)(1),
(2), (4) Date: Jul. 18, 2012

(87) PCT Pub. No.: WO2011/089934
PCT Pub. Date: Jul. 28, 2011

(65) Prior Publication Data
US 2012/0285757 A1 Nov. 15, 2012

(30) Foreign Application Priority Data
Jan. 19, 2010 (JP) .................... 2010-009064

(51) Int. Cl.
*B60K 11/00* (2006.01)
(52) U.S. Cl.
USPC ........ 180/68.1; 180/68.2; 180/68.3; 180/68.5

(58) Field of Classification Search
USPC .................. 180/68.1, 68.2, 68.4, 68.5, 65.1; 903/903
See application file for complete search history.

(56) References Cited

U.S. PATENT DOCUMENTS 6,678,972 B2 * 1/2004 Naruse et al. .................. 37/466
7,810,597 B2 * 10/2010 Imashige ..................... 180/69.2

FOREIGN PATENT DOCUMENTS

| JP | 11-140906 | 5/1999 |
|---|---|---|
| JP | 2002-227241 | 8/2002 |
| JP | 2003-328392 | 11/2003 |
| JP | 2007-205097 | 8/2007 |
| JP | 2007-224585 | 9/2007 |
| JP | 2008-19616 | 1/2008 |

* cited by examiner

*Primary Examiner* — John Walters
*Assistant Examiner* — James Triggs
(74) *Attorney, Agent, or Firm* — Antonelli, Terry, Stout & Kraus, LLP.

(57) ABSTRACT

The construction machine including an engine room having an engine, a radiator ii for cooling the engine, and a hydraulic pump which are arranged therein, and a counterweight area which is located adjacent to the engine room and in which batteries are installed, a ventilation passage for cooling the engine room and a ventilation passage for cooling the batteries are formed separately and independently in the substantially same direction, and a flowing direction of cooling air flowing in the ventilation passage for cooling the engine room and a flowing direction of cooling air flowing in the ventilation passage for cooling the batteries are substantially parallel to each other.

19 Claims, 4 Drawing Sheets

(a)

(b)

COOLING STRUCTURE FOR CONSTRUCTION MACHINE

TECHNICAL FIELD

The present invention relates to a construction machine having an engine room and a counterweight area and employing batteries as a counterweight to be installed in the counterweight area and, more particularly, to a cooling structure for a construction machine which can efficiently discharge heat produced in batteries and, at the same time, does not allow exhaust air of an engine room to be sucked into a counterweight area side.

BACKGROUND ART

Recently, for the purpose of conservation of the global environment, in the field of motor vehicles, hybrid drive type motor vehicles have been sold by respective companies. Also, in the field of construction machines, for the purposes of reduction in fuel consumption and of reduction in $CO_2$ emissions, hybrid drive type construction machines with engines and electric motors combined, and battery drive type construction machines which are driven by batteries only have been developed.

As for electrical storage devices for hybrid drive type construction machines, for example, capacitors or the like which can momentarily supply high power but have small electricity accumulation capacities may be used. Also, lead batteries, lithium ion batteries or the like which cannot momentarily supply high power but have large electricity accumulation capacities may be used. Further, both types of batteries may be used together. Generally, these electrical storage devices have low heat resistance temperatures and are often required to be sufficiently cooled by comparatively low temperature air. Particularly, the lead batteries have low heat resistance temperatures and are required to be sufficiently ventilated and cooled.

Moreover, these electrical storage devices are typically often heavy in weight and volumes required for mounting them are also often large. Therefore, as their installing places with respect to the vehicle bodies, examples which employ counterweight areas of rear end portions of vehicle bodies are disclosed in, for example, Patent Literature 1 and 2.

JP patent laid-open No. 2007-224585 as Patent Literature 1 discloses the following example. In a battery drive type construction machine, batteries are installed in a counterweight area that is provided in a rearmost portion of the construction machine and the batteries are cooled by a fan, and batteries that are heavy products are installed in the counterweight area so that the batteries also serve the role of a counterweight to achieve a weight balance between them and a boom.

However, according to the invention disclosed in Patent Literature 1, cooling air is not introduced directly from the outside air, but air after cooling an oil cooler is conducted to a fan for cooling the batteries in order to cool the batteries. In this cooling structure, the following cases become problems, such as, in a case where the number of installed batteries is large, in a case where the calorific values of the batteries are high, or in a case where the heat resistance temperatures of the batteries are low, the temperature of the cooling air supplied to the batteries rises compared to that of the outside air, thereby the cooling performance in the cooling of the batteries is deteriorated.

Moreover, JP patent laid-open No. 2003-328392 as Patent Literature 2 discloses an arranging structure for equipment of a hybrid drive type construction machine. This discloses a structure in which batteries are arranged in a counterweight area and covered with a cover. However, consideration is not paid to a structure for cooling the batteries themselves.

Therefore, in this installing structure for the batteries, the following cases become a problem, such as, in a case where the number of the installed batteries is large or in a case where the calorific values of the batteries are high, temperature of air around the batteries increases, thereby the cooling performance in the cooling of the batteries is considerably deteriorated.

CITATION LIST

Patent Literature

PATENT LITERATURE 1: JP patent laid-open No. 2007-224585
PATENT LITERATURE 2: JP patent laid-open No. 2003-328392

SUMMARY OF INVENTION

Technical Problem

If a hybrid drive system which is applied to a construction machine, particularly, to a hydraulic excavator is considered, it is contemplated that a large number of lead batteries, lithium ion batteries, nickel-hydrogen batteries, or the like which can be charged in a plug-in manner at night is installed in a turning body so that reduction in fuel consumption and reduction in $CO_2$ emissions are achieved. In the case of the hybrid drive system, since electrically powered equipment for the hybrid drive system, is additionally installed in addition to the existing engine, hydraulic pump, radiator for cooling the engine, and the like, a great problem is raised in the arrangement of the electrically powered equipment in the interior of the turning body. Particularly, the batteries are often heavy in weight, and also, since a large number of batteries are required to be installed in order to bring out the merit of the reduction in fuel consumption provided via the plug-in manner, their mounting volumes are increased. Therefore, a counterweight area in a rear end portion of a vehicle body is suitable to be selected as an installing place of the batteries with respect to the vehicle body.

However, though the lead batteries, the lithium ion batteries, the nickel-hydrogen batteries and the like typically have low heat resistance temperatures and exhibit comparatively low calorific values, they often require special cooling. Therefore, it becomes a problem that the large number of batteries installed in the counterweight area should be efficiently cooled. Particularly, an engine room is located on a forward side adjacent to the counterweight area, so that in considering the cooling of the batteries having the low heat resistance temperatures, it becomes a great problem that exhaust air whose temperature rises after ventilating and cooling the engine room should not be allowed to be sucked as cooling air for cooling the batteries.

Moreover, for cooling the batteries, an exclusive cooling passage which is independent from a cooling passage for the engine room is required. It becomes a problem that the cooling performance in the cooling of the batteries should be improved by configuring the passage in such a manner that it allows the outside air to be supplied directly to the batteries while being left at low temperature.

Since, in the cooling passage for the batteries, the batteries are installed in a multiple step manner along a flowing direction, ventilation resistance of the cooling air is increased. In a passage between an air intake port and an air exhaust port, it becomes a problem that air leakage and inflow of air should be prevented in order to secure the cooling performance in the cooling of the batteries.

Moreover, the counterweight area is a space curved in a circular-arc shape and further has a large space also in a vertical direction. Therefore, the batteries are not necessarily brought to a regularly installed state in order to increase the installation density of the batteries. In a case where the batteries are brought to an irregularly installed-state, it becomes a problem that the flow of the cooling air must be controlled in order that uniform cooling air can be supplied to the respective batteries.

Moreover, an air intake port and air exhaust port for cooling the batteries are formed in a counterweight structure as opening portions, so that it is often impossible to provide substantial large openings because of restriction for securing the strength of the counterweight structure. Therefore, there are the following problems. The sizes of the air intake port and air exhaust port should be reduced compared to a size of a ventilation cross-sectional surface for the batteries and cooling air from the air intake port must be sufficiently widely supplied to the ventilation cross-sectional surface for the batteries.

Moreover, the construction machines are almost used outside, so that it becomes a problem that solar heat should be prevented from intruding into the batteries-installed area under the blazing sun in the summer season.

The present invention has been made in view of the problems of the related art. An object of the present invention is to provide a cooling structure for a construction machine, which can efficiently cool a large number of batteries which is installed in a counterweight area.

Solution to Problem

In order to achieve the above-mentioned object, a first aspect of the present invention is characterized by a cooling structure for a construction machine, the construction machine including:
an engine room having an engine, a radiator for cooling the engine, and a hydraulic pump which are installed therein; and
a counterweight area having batteries installed therein,
wherein a ventilation passage for cooling the engine room and a ventilation passage for cooling the batteries are formed separately and independently; and
an air exhaust port of the ventilation passage for cooling the engine room and an air intake port of the ventilation passage for cooling the batteries are formed in different surfaces to each other.

A second aspect of the present invention is characterized in that, in the first aspect, the different surfaces are mutually opposite side surfaces of the construction machine.

A third aspect of the present invention is characterized by a cooling structure for a construction machine, the construction machine including:
an engine room having an engine, a radiator for cooling the engine, and a hydraulic pump which are installed therein; and
a counterweight area having batteries installed therein,
wherein a ventilation passage for cooling the engine room and a ventilation passage for cooling the batteries are formed separately and independently; and
a flowing direction of cooling air flowing in the ventilation passage for cooling the engine room and a flowing direction of cooling air flowing in the ventilation passage for cooling the batteries are substantially the same.

A fourth aspect of the present invention is characterized by a cooling structure for a construction machine, the construction machine including:
an engine room having an engine, a radiator for cooling the engine, and a hydraulic pump which are installed therein; and
a counterweight area having batteries installed therein,
wherein a ventilation passage for cooling the engine room and a ventilation passage for cooling the batteries are formed separately and independently;
an air intake port of the ventilation passage for cooling the engine room and an air intake port of the ventilation passage for cooling the batteries are formed in the same side surface of the construction machine; and
an air exhaust port of the ventilation passage for cooling the engine room and an air exhaust port of the ventilation passage for cooling the batteries are formed in the same side surface of the construction machine which s opposite to the side surface with the air intake ports formed.

A fifth aspect of the present invention is characterized in that, in any one of the first to fourth aspects, a blower generating cooling air for the batteries is installed at a downstream portion of the flowing direction of the cooling air flowing in the ventilation passage for cooling the batteries.

A sixth aspect of the present invention is characterized in that, in any one of the first to fourth aspects, a blower generating the cooling air for the batteries is installed at a middle portion of the flowing direction of the cooling air flowing in the ventilation passage for cooling the batteries.

A seventh aspect of the present invention is characterized in that, in any one of the first to sixth aspects, a ventilation duct which connects an air intake port and an air exhaust port for the cooling air for cooling the batteries and forms the ventilation passage for cooling the batteries is provided in the counterweight area and the batteries is installed in the ventilation duct.

An eighth aspect of the present invention is characterized in that, in any one of the first to seventh aspects, a guide part that guides a flow of the cooling air, for example, an air scattering resistant plate, a conducted-air guide plate, a dummy resistant plate, and the like which will be described hereinafter, is installed in the ventilation passage for cooling the batteries.

A ninth aspect of the present invention is characterized in that, in any one of the first to eighth aspects, a thermal insulating member is installed in the ventilation passage for cooling the batteries.

A tenth aspect of the present invention is characterized in that, in any one of the first to ninth aspects, the batteries are installed at spaces for ventilating the cooling air along the flowing direction of the cooling air flowing in the ventilation passage for cooling the batteries.

An eleventh aspect of the present invention is characterized in that, in any one of the first to tenth aspects, the batteries are installed at spaces for ventilating the cooling air along a direction perpendicular to the flowing direction of the cooling air flowing in the ventilation passage for cooling the batteries.

A twelfth aspect of the present invention is characterized in that, in any one of the first to eleventh aspects, shelf plates are installed in the counterweight area in a multiple step manner, the batteries are fixed on the respective shelf plates, and the spaces for ventilating the cooling air are formed between the batteries and shelf plates above the batteries.

A thirteenth aspect of the present invention is characterized in that, in any one of the first to twelfth aspects, the batteries are batteries selected from a group including lead batteries, lithium ion batteries, and nickel-hydrogen batteries.

Advantageous Effect of Invention

The present invention is constituted as described above and can provide the cooling structure for a construction machine, which can efficiently cool the plural batteries installed in the counterweight area.

DESCRIPTION OF EMBODIMENTS

In a hybrid drive type construction machine, particularly, in a hydraulic excavator, it is contemplated that a so-called plug-in hybrid drive system is employed. The plug-in hybrid drive system receives electric power from an external commercial power supply or the like to charge lead batteries, lithium ion batteries, nickel-hydrogen batteries, or the like in a time zone such as night with no hydraulic excavator used, and drives a motor by successively using the charged electric power of the batteries in using the hydraulic excavator. This makes it possible to more achieve reduction in fuel consumption and reduction in $CO_2$ emissions as compared to a general hybrid system that is, not the plug-in system, so that the present invention is suitable particularly for a plug-in hybrid drive type construction machine.

The present invention will be explained in detail with reference to the drawings illustrating embodiments.

Figure 1:
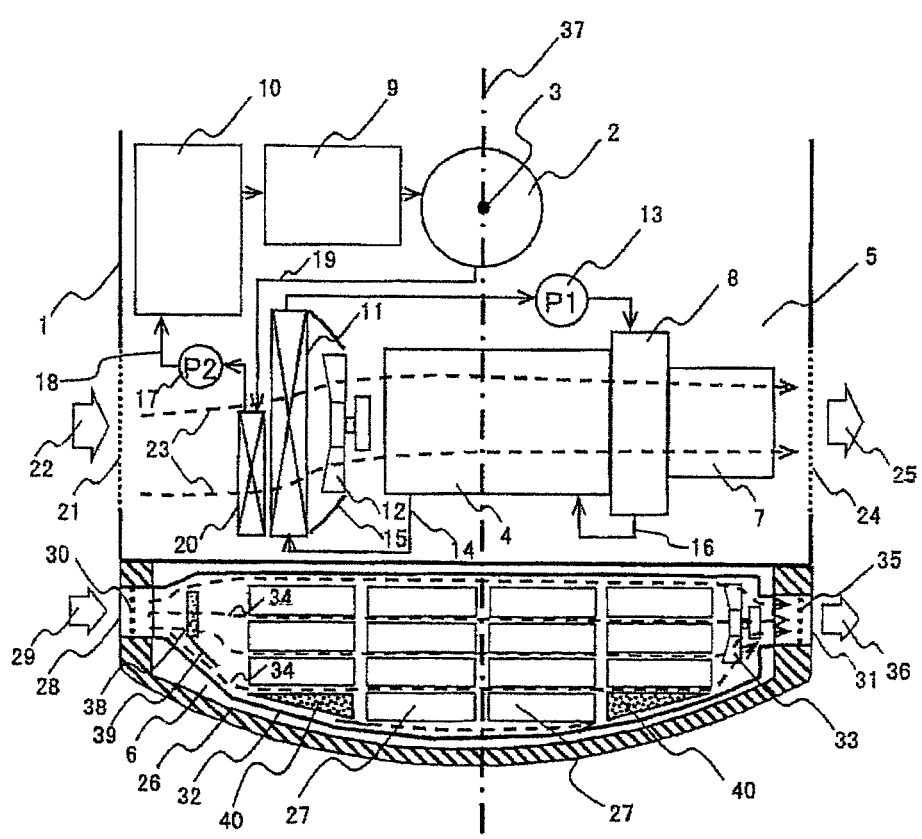
FIG. 1 is a top plane sectional view of a turning body according to a first embodiment of the present invention.
Figure 2:
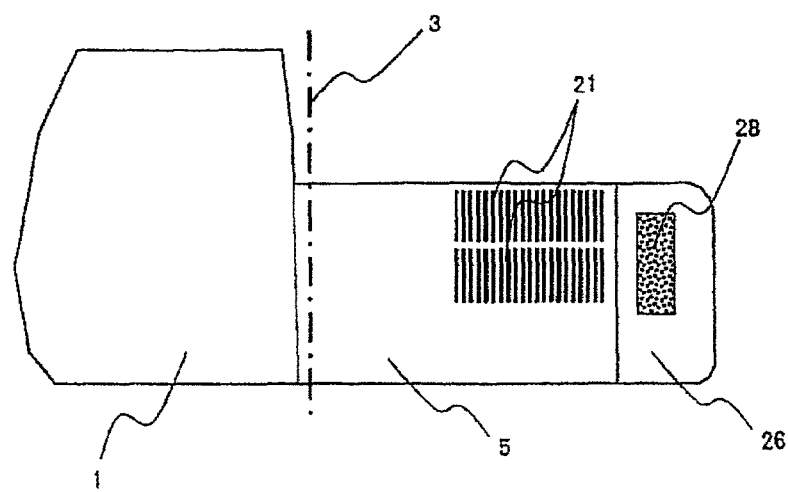
FIG. 2 is a view of the turning body, wherein (a) is a left side view and (b) is a right side view.
Figure 2:
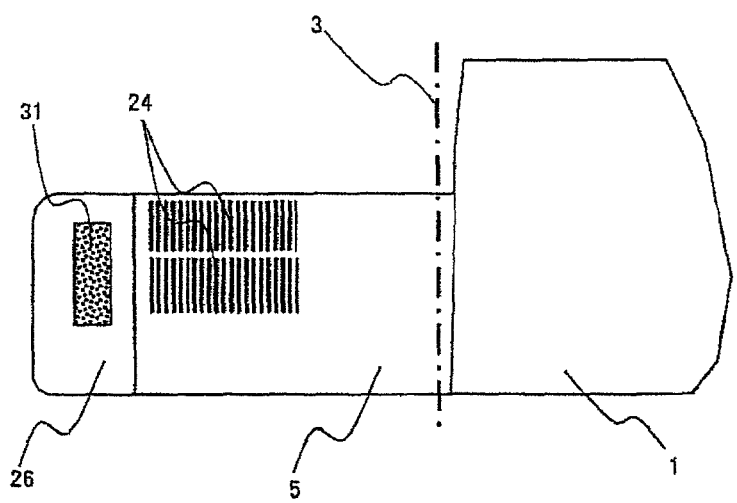
Figure 3:
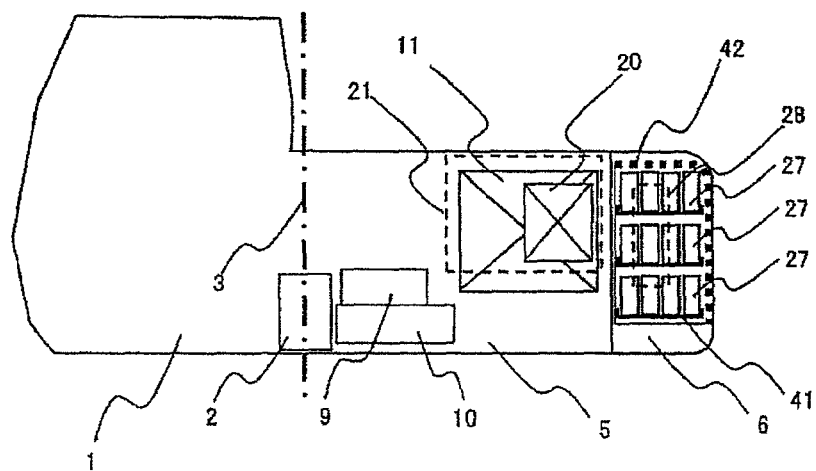
FIG. 3 is a left sectional view of the turning body.

FIGS. 1 to 3 are views illustrating a cooling structure for a construction machine (turning body) such as a hydraulic excavator according to a first embodiment of the present invention. FIG. 1 is a top plane sectional view of the turning body, FIG. 2(a) is a left side view of the turning body, FIG. 2(b) is a right side view of the turning body, and FIG. 3 is a left sectional view of the turning body.

In the embodiment, a cooling structure for batteries and other equipment is shown with respect to a rear half section of the turning body of a plug-in hybrid drive type hydraulic excavator.

As shown in FIG. 1, a turning motor 2 which generates turning force by electricity is installed at a substantially center position of the turning body 1. The turning body 1 is rotation-driven about a center shaft 3 of the turning motor 2. The turning body 1 is provided with an engine room 5 having not only an engine 4 but also many oil hydraulic equipments and electrically powered equipments installed therein, and a counterweight area 6 provided at a vehicle body rear end portion which is adjacent to the engine room 5.

In the engine room 5, the engine 4 such as a diesel type engine, a hydraulic pump 7, and an assist motor 8 are installed. The diesel type engine is arranged at a center portion of the engine room 5, the hydraulic pump is provided for causing a boom and the like to be driven toward the right side of the sheet of the drawing, and the assist motor is arranged between the engine 4 and the hydraulic pump 7, assists the operation of the engine 4, and drives the hydraulic pump 7. Moreover, in the engine room 5, an inverter 9, a capacitor 10, an engine radiator 11, a ventilation fan 12, a cooling water pump 13 (P1), and the like are installed. The inverter is provided for driving the turning motor 2, the capacitor is provided for regenerating and accumulating electric power of the turning motor 2 and thereafter instantaneously discharging the electric power, and the engine radiator is provided for water-cooling the engine 4.

Heat which is produced in the engine 4 is absorbed by cooling water which is circulated by the cooling water pump 13 (P1) and a cooling water pipe 14, and heat-transported to the engine radiator 11. The cooling water which is fed into the engine radiator 11 is cooled by an air flow which is supplied from the left side of the sheet of the drawing by the ventilation fan 12. The cooling water is mixed with approximately 50% of an antifreezing solution such as ethylene glycol or propylene glycol, for example, and does not freeze even under low temperature in winter season or the like.

A partition wall 15 is arranged between the ventilation fan 12 and the engine radiator 11, thus making it difficult to cause suction due to leakage of the air flow between the ventilation fan 12 and the engine radiator 11. The cooling water which is cooled in the engine radiator 11 is pressurized with the cooling water pump 13 (P1), thereafter cools the assist motor 8, and is again supplied to the engine 4 via a cooling water pipe 16.

On the other hand, the turning motor 2, the inverter 9 and the capacitor 10 are also cooled by cooling water which is mixed with the same antifreezing solution as that of the engine cooling water. However, since the heat resistance temperature of the capacitor 10 or inverter 9 is lower than that of the engine 4, a water cooling system is constituted which is separate and independent from that of the cooling water for the engine.

The cooling water which is pressurized with a cooling water pump 17 (P2) is supplied, via a cooling water pipe 18, to the capacitor 10 whose heat resistance temperature is lowest in the water cooling system for the electrically powered equipments. After the cooling water cools the capacitor 10, it successively cools the inverter 9 and the turning motor 2 and finally flows into a radiator 20 for the exclusive use of the electrically powered equipments via a cooling water pipe 19. The radiator 20 for the exclusive use of the electrically powered equipments is arranged on the upstream side of the engine radiator 11 and heat-radiates by using the cooling air produced by the ventilation fan 12.

In this way, the structure is employed in which the heat generated by the engine 4, the assist motor 8, the turning motor 2, the inverter 9, the capacitor 10, and the like which are arranged in the engine room 5 is collectively radiated by the engine radiator 11 and the radiator 20 for the exclusive use of the electrically powered equipments.

An air flow for cooling the two radiators 11, 20 in the engine room 5 is sucked as intake air 22 from an air intake port 21 provided in a left side surface of the engine room 5, flows in turn through the radiator 20 for the exclusive use of the electrically powered equipments, the engine radiator 11, the ventilation fan 12, the engine 4, the assist motor 8, and the hydraulic pump 7 in ventilation passages 23 to cool the respective equipments, and is discharged as exhaust air 25 to the outside from an air exhaust port 24 provided in a right side surface of the engine room 5.

Batteries, which can be charged via the plug-in manner at night by using a commercial power supply, for example, lead batteries, lithium ion batteries, and nickel-hydrogen batteries, are often heavier in weight, compared to other installed-parts. Moreover, plural batteries are required to be installed in order to bring out the merit of reduction in fuel consumption by the plug-in manner, thus causing their mounting volumes to become large. Therefore, it is desirable that the counterweight area 6 of the vehicle body rear end section is selected as the installing place of the batteries with respect to the turning body 1.

As shown in FIG. 1, a large number of rectangular parallelepiped batteries 27 are installed in the counterweight area 6 which is surrounded by a counterweight structure wall 26. Though the lead batteries 27 have low heat resistance temperatures and exhibit comparatively low calorific values, they are required to be subjected to special cooling. Therefore, it is necessary to efficiently cool the large number of lead batteries 27 installed in the counterweight area 6. Moreover, in considering the cooling of the batteries 27 whose heat resistance temperatures are low, it becomes an important problem that the exhaust air 25 whose temperature rises after ventilating and cooling the engine room 5 should not be allowed to be sucked as cooling air for cooling the lead batteries 27. For this purpose, an air-cooling structure for the lead batteries 27 which will be described hereinafter is employed.

An air flow which cools the lead batteries 27 is sucked as intake air 29 from an air intake port 28 provided in the counterweight structure wall 26, passes through a porous plate or louver door 30 preventing inflow of dust and the like, and flows into the counterweight area 6.

An air exhaust port 31 is provided in a side surface (position) of the counterweight structure wall 26 which is opposite to the side surface of the counterweight structure wall in which the air intake port 28 is provided. A ventilation duct 32 which connects the air intake port 28 and the air exhaust port 31 is provided between the air intake port 28 and the air exhaust port 31. The large number of lead batteries 27 is alignedly arranged in the ventilation duct 32. This ventilation duct 32 makes it possible to prevent leakage of air and inflow of air which occur due to increase in ventilation resistance by installation of the lead batteries 27 in a multiple-step manner along an air flow direction, thus making it possible to improve the cooling performance in the cooling of the lead batteries 27.

A ventilation fan 33 for the lead batteries, which efficiently moves the conducted cooling air, is installed in the ventilation duct 32. In this embodiment, the ventilation fan 33 for the lead batteries is installed in the most downstream portion in a cooling air flowing direction in the ventilation duct 32. The cooling air which is sucked as the intake air 29 from the air intake port 28 passes among the lead batteries 27 as indicated by ventilation passages 34, cools all the lead batteries 27, and flows into the ventilation fan 33 for the lead batteries. The air flow which contributes to the cooling of the lead batteries 27 passes through a porous plate or louver door 35, and is exhausted as exhaust air 36 out of the machine from the air exhaust port 31. In this way, the ventilation fan 33 for the lead batteries is installed in the most downstream portion in the cooling air flowing direction in the ventilation duct 32, thus making it possible to generate uniform cooling air to respective battery arrays.

In this embodiment, the ventilation passages 34 for cooling the lead batteries 27 are independent from the ventilation passages 23 for cooling the engine room 5, and extend in the substantially same longitudinal direction as the ventilation passages 23 extend, and the flowing directions of the cooling airs cooling the lead batteries 27 and the engine room 5 are adapted to become substantially parallel to each other.

As shown in FIG. 2(*a*), the air intake port 28 for the cooling air cooling the lead batteries 27 and the air intake port 21 for the cooling air cooling the engine room 5 are formed in the same left side surface with respect to a center cross-sectional surface 37 of the turning body 1 which includes a turning shaft of the turning body 1 and a boom operation surface. As shown in FIG. 2(*b*), the air exhaust port 31 for the cooling air cooling the lead batteries 27 and the air exhaust port 24 for the cooling air cooling the engine room 5 are formed in the same right side surface opposite to the left side surface. Thereby, it is possible to prevent the exhaust air 25, whose temperature rises after ventilating and cooling the engine room 5, from being sucked as the cooling air (intake air 29) for cooling the batteries. Thereby, the outside air can be supplied directly to the lead batteries 27 while being left at low temperature and it is possible to achieve an improvement of the cooling performance in the cooling of the lead batteries 27.

As shown in FIG. 1, the counterweight area 6 is a space which is curved in a circular arc-shape, and has a large space also in a vertical direction, so that in order to increase the installation density of the lead batteries 27, the lead batteries 27 are brought to an irregularly installed-state that is not such a grid pattern arrangement as shown in the drawing. In this case, the cooling air for the lead batteries 27 flows into a place into which it is easy to flow, so that a problem is raised such that uniform cooling air is hard to be supplied to the respective lead batteries 27. In order to address the problem, it is necessary to control the flow of the cooling air.

Moreover, the air intake port 28 and air exhaust port 31 for cooling the batteries are formed as opening portions in the counterweight structure wall 26, but they cannot be formed as considerably large opening portions because of restriction for securing the strength of the counterweight structure wall 26. Therefore, the sizes of the air intake port 28 and air exhaust port 31 are made smaller, compared to the size of the ventilation cross-sectional surface of the center portion of the ventilation duct 32 for cooling the lead batteries 27, and the cooling air from the air intake port 28 must be sufficiently widely supplied.

In order to cope with these problems, in this embodiment, an air scattering resistant plate 38 such as a porous plate or slit plate is arranged in the proximity of an inner side of the air intake port 28, and a conducted-air guide plate 39 is attached in an inclined state to an end portion of the air scattering resistant plate 38. The end portion is opposed to the counterweight structure wall 26 which is curved in the circular arc-shape.

The cooling air which is led to flow from the air intake port 28 as the intake air 29 and has a strong directivity is applied to the air scattering resistant plate 38, and scattered in an outer peripheral direction of the air scattering resistant plate 38. Moreover, the cooling air is guided by the conducted-air guide plate 39 whereby the cooling air is conducted toward the rear end portion which the cooling air is hard to reach.

Moreover, in regions with no lead batteries 27 installed, for example, regions between a circular arc-shaped sidewall portion of the counterweight structure wall 26 and the lead battery 27 arrays, dummy resistant members 40 are arranged. The dummy resistant members are provided for allowing smooth flowing of air and have, for example, triangular-shapes in cross-section. Unless the dummy resistant members 40 are installed, the cooling air preferentially flows into the space portion with no lead batteries 27 installed, and the inflow of the cooling air into the portion with the lead batteries 27 installed is reduced, thus causing an adverse effect of producing unevenness of cooling the lead batteries 27.

Even if the lead batteries 27 are brought to the irregularly installed state as described above, it is possible to control the flow of the cooling air in such a manner that the cooling air can be uniformly supplied to the respective lead batteries 27. Moreover, it is possible to sufficiently widely and wholly supply the cooling air from the air intake port 28 to the ventilation cross-sectional surface for the lead batteries 27. The air intake port is formed as a narrow opening portion.

In the turning body 1 which is rotation-driven around the center shaft 3 of the turning motor 2, as shown in FIG. 2(a), the air intake port 21 for the cooling air cooling the engine room 5 and the air intake port 28 for the cooling air cooling the lead batteries 27 are both provided in the left side surface of the turning body 1. Moreover, as shown in FIG. 2(b), the air exhaust port 31 for the cooling air after cooling the lead batteries 27 and the air exhaust port 24 for the cooling air after cooling the engine room 5 are both provided in the right side surface of the turning body 1.

The above-mentioned structure makes it possible to prevent the exhaust air, whose temperature rises after ventilating and cooling the engine room 5, from being sucked as the cooling air for cooling the batteries, and to allow the outside air to be supplied directly to the lead batteries 27 while being left at the low temperature, so that it is possible to improve the cooling performance in the cooling of the lead batteries 27.

As shown in FIG. 3, in the interior of the counterweight area 6, the lead batteries 27 are respectively carried on shelf plates 41 which are installed in a multiple step manner (in the drawing, three steps), and the respective lead batteries 27 are fixed by unshown fixtures. Moreover, the respective shelf plates 41 are fixed in the interior of the counterweight area 6 by mounting jigs (not shown) provided with vibration isolation mechanisms. Even if the vehicle travels on an uneven ground, these structures make it possible to protect the lead batteries 27 from vibration produced due to the traveling.

In this way, the lead batteries 27 are stacked in the multiple step manner by using the shelf plates 41, whereby clearances through which the cooling air flows can be provided between the lead batteries 27 and shelf plates 41 above the lead batteries (refer to FIG. 3). Moreover, when the lead batteries 27 are fixed on the shelf plates 41, they are fixed in such a manner that clearances are provided between them and adjacent lead batteries 27 (refer to FIG. 1). The clearances are provided vertically and on the same plane, to thereby improve the effect of cooling the lead batteries 27.

Since the construction machines are almost used outside, it becomes a problem that solar heat should be prevented from intruding into the batteries-installed area under the blazing sun in summer season. Therefore, thermal insulating members 42 for preventing the intrusion of the heat due to solar radiation are installed on an upper wall surface or (and) sidewall surfaces in the ventilation passage for cooling the lead batteries 27. Thereby, it is possible to prevent the solar heat from intruding into the counterweight area 6. The materials of the thermal insulating members 42 may be general thermal insulating materials such as urethane foam or glass fibers. If they are vacuum insulation materials recently used in a refrigerator and the like, the thermal insulating effect is more improved. Thus, it is possible to achieve the cooling structure which does not bring about the temperature rise of the lead batteries 27 by the solar heat even under the blazing sun in the summer season.

Figure 4:
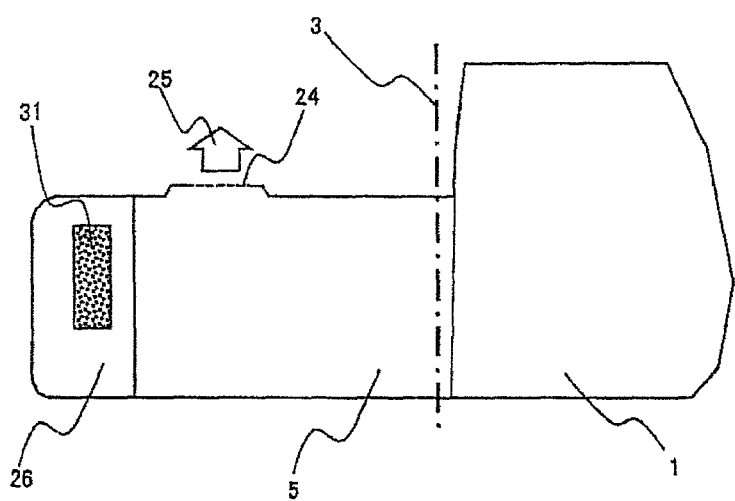
FIG. 4 is a right side view of a turning body according to a second embodiment of the present invention.

FIG. 4 is a right side view of a turning body according to a second embodiment of the present invention. This embodiment is different from the first embodiment in that the air exhaust port 24 for the cooling air cooling the engine room 5 is not provided in the right side surface but is provided in a top surface of the right side portion and the exhaust air 25 for cooling the engine room 5 is discharged upward.

Thus, the air intake ports 21, 28 and the air exhaust ports 24, 31 for the cooling air cooling the engine room 5 and lead batteries 27 are not necessarily formed in the side surface portion of the turning body 1 and the structure which does not allow the exhaust air 25, whose temperature rises after ventilating and cooling the engine room 5, to be sucked as the cooling air for cooling the batteries only has to be employed.

Figure 5:
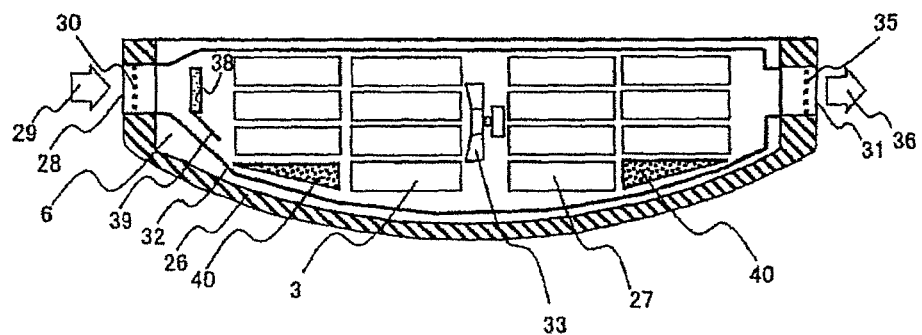
FIG. 5 is a top plane sectional view of a counterweight area according to a third embodiment of the present invention.

FIG. 5 is a top plane sectional view of a counterweight area according to a third embodiment of the present invention.

This embodiment is different from the first embodiment in that the ventilation fan 33 for the lead batteries which generates the cooling air for the lead batteries 27 is installed at a middle portion of the ventilation passage for cooling the lead batteries 27.

In this way, the ventilation fan 33 for the lead batteries is installed at the middle portion of the ventilation passage, whereby the ventilation fan 33 for the lead batteries is spaced at a substantially equal distance apart from both the air intake port 28 and the air exhaust port 31, so that noise generated from the ventilation fan 33 for the lead batteries is hard to be leaked and it is possible to achieve a low-noise cooling structure for the batteries.

Figure 6:
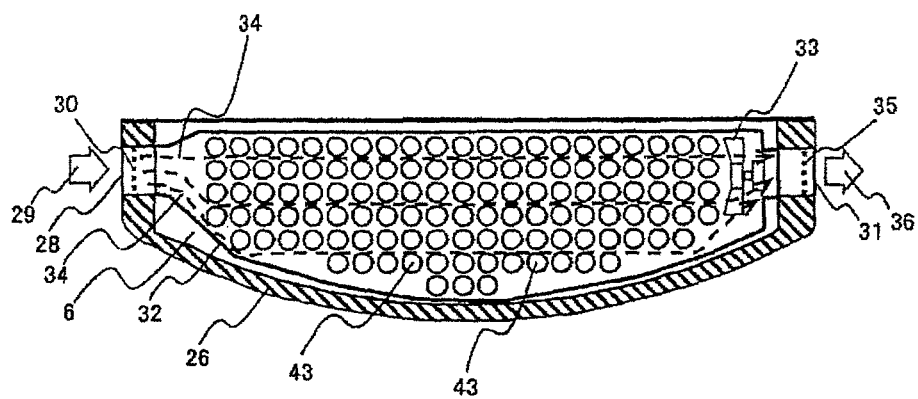
FIG. 6 is a top plane sectional view of a counterweight area according to a fourth embodiment of the present invention.

FIG. 6 is a top plan sectional view of a counterweight area according to a fourth embodiment of the present invention.

This embodiment is different from the first embodiment in that small-sized batteries 43 of cylindrical shapes are installed in lieu of the large-sized batteries of rectangular parallelepiped shapes. The small-sized batteries 43 of cylindrical shapes include, for example, lithium ion batteries, nickel-hydrogen batteries, and the like. Even if the small-sized batteries 43 of cylindrical shapes are lead batteries, there is no problem.

The lead batteries are inexpensive but cannot momentarily supply the large amount of power, so that there is a problem that they must be used together with capacitors or the like. The lithium ion batteries or the like are batteries with both the advantage of the lead batteries and the advantage of the capacitors (the electrically charging amount is high and the momentarily supplied power is high), and are considered to be increased in use in the future. As the lithium ion batteries, small-sized cell shapes such as cylindrical shapes and flat square shapes are often employed in view of safety. In this embodiment, the cylindrical shapes are exemplified.

The lithium ion batteries typically tend to exhibit high calorific values. Ventilating and cooling of the lithium ion batteries become a more important problem as compared to the ventilating and cooling of the lead batteries. As in this embodiment, the ventilating and cooling structure for the lithium ion batteries is employed, thereby making it possible to cool the small-sized batteries, such as the lithium ion batteries, with high reliability.

According to the present invention, even if the large number of batteries whose heat resistance temperatures are comparatively low is installed in the counterweight area, it is possible to achieve a hybrid drive system for a construction machine, which can ensure the cooling performance, has high reliability, achieves low fuel consumption, has the low $CO_2$ emission level, achieves the low noise operation, and implements the vibration isolation property.

Next, an effect of each claim of the present invention will be explained.

According to the inventions as defined in claims 1 to 4, it is possible to efficiently cool the batteries installed in the counterweight area. Further, it is possible to prevent the exhaust air, whose temperature rises after ventilating and cooling the engine room, from being sucked as the cooling air for cooling the batteries. Furthermore, the outside air is supplied directly to the batteries while being left at low temperature and the cooling performance in the cooling of the batteries can be improved.

According to the invention as defined in claim 5, the blower is installed at the downstream portion of the ventilation passage for cooling the batteries, whereby it is possible to generate the uniform cooling air with respect to the respective battery arrays.

According to the invention as defined in claim 6, the blower is installed at the middle portion of the ventilation passage for cooling the batteries, whereby it is possible to achieve the low-noise cooling-structure in which leakage of noise generated from the blower is reduced.

According to the invention as defined in claim 7, it is possible to prevent the leakage of air and the inflow of air.

According to the invention as defined in claim 8, even if the batteries are bought to the irregularly installed state, it is possible to control the flow of the cooling air in such a manner that the uniform cooling air can be supplied to the respective batteries. Moreover, it is possible to sufficiently widely supply the cooling air from the air intake port formed as the narrow opening portion to the ventilation cross-sectional surface of the ventilation passage.

According to the invention as defined in claim 9, it is possible to prevent the solar heat from intruding into the batteries-installed area under the blazing sun in the summer season.

According to the inventions as defined in claims 10 to 12, it is possible to more improve the effect of the cooling of the batteries.

Ultimately, even if the large number of batteries whose heat resistance temperatures are comparatively low is installed in the counterweight area, the present invention makes it possible to achieve the hybrid drive system for the construction machine, which can ensure the cooling performance, has the high reliability, achieves the low fuel consumption, has the low $CO_2$ emission level, achieves the low noise operation, and implements the vibration isolation property.

While the embodiments which are applied to the construction machine, particularly, the hydraulic excavator have been described above, the present invention is not limited to the case where it is applied to the hydraulic excavator, and the present invention is applicable to various construction machines including, for example, a compact excavator, a wheel loader, a bulldozer, a dump truck, or the like.

REFERENCE SIGNS LIST

1 . . . Turning body
2 . . . Turning motor
3 . . . Center shaft
4 . . . Engine
5 . . . Engine room
6 . . . Counterweight area
7 . . . Hydraulic pump
8 . . . Assist motor
9 . . . Inverter
10 . . . Capacitor
11 . . . Engine radiator
12 . . . Ventilation fan
13 . . . Cooling water pump (P1)
14 . . . Cooling water pipe
15 . . . Partition wall
16 . . . Cooling water pipe
17 . . . Cooling water pump (P2)
18 . . . Cooling water pipe
19 . . . Cooling water pipe
20 . . . Radiator for exclusive use of electrically powered equipment
21 . . . Air intake port
22 . . . Intake air
23 . . . Ventilation passage
24 . . . Air exhaust port
25 . . . Exhaust air
26 . . . Counterweight structure wall
27 . . . Lead battery
28 . . . Air intake port
29 . . . Intake air
30 . . . Porous plate or louver door
31 . . . Air exhaust port
32 . . . Ventilation duct
33 . . . Ventilation fan for lead battery
34 . . . Ventilation passage
35 . . . Porous plate or louver door
36 . . . Exhaust air
37 . . . Center cross-sectional surface of turning body
38 . . . Air scattering resistant plate
39 . . . Conducted-air guide plate
40 . . . Dummy resistant member
41 . . . Shelf plate
42 . . . Thermal insulating member
43 . . . Small-sized battery

The invention claimed is:

1. A cooling structure for a construction machine, the construction machine comprising:
  an engine room including an engine, a radiator for cooling the engine, and a hydraulic pump; and
  a counterweight area including batteries,
  wherein: a ventilation passage for cooling the engine room and a ventilation passage for cooling the batteries are formed separately and independently; and
  an air exhaust port of the ventilation passage for cooling the engine room and an air intake port of the ventilation passage for cooling the batteries are formed in different surfaces to each other, and
  wherein: a ventilation duct that connects the air intake port and an air exhaust port for cooling air for cooling the batteries to form the ventilation passage for cooling the batteries is provided in the counterweight area; and
  the batteries are installed in the ventilation duct.

2. The cooling structure for a construction machine, according to claim 1, wherein the different surfaces are mutually opposite side surfaces of the construction machine.

3. The cooling structure for a construction machine, according to claim 1, wherein a blower that generates the cooling air for the batteries is installed at a downstream portion of the flowing direction of the cooling air flowing in the ventilation passage for cooling the batteries.

4. The cooling structure for a construction machine, according to claim 1, wherein a blower that generates the cooling air for the batteries is installed at a middle portion of the flowing direction of the cooling air flowing in the ventilation passage for cooling the batteries.

5. A cooling structure for a construction machine, the construction machine comprising:
  an engine room including an engine, a radiator for cooling the engine, and a hydraulic pump; and
  a counterweight area including batteries,
  wherein: a ventilation passage for cooling the engine room and a ventilation passage for cooling the batteries are formed separately and independently; and an air exhaust port of the ventilation passage for cooling the engine room and an air intake port of the ventilation passage for cooling the batteries are formed in different surfaces to each other, and wherein a guide part that guides a flow of cooling air is installed in the ventilation passage for cooling the batteries.

6. A cooling structure for a construction machine, the construction machine comprising:

an engine room including an engine, a radiator for cooling the engine, and a hydraulic pump; and a counterweight area including batteries, wherein: a ventilation passage for cooling the engine room and a ventilation passage for cooling the batteries are formed separately and independently; and an air exhaust port of the ventilation passage for cooling the engine room and an air intake port of the ventilation passage for cooling the batteries are formed in different surfaces to each other, and wherein a thermal insulating member is installed in the ventilation passage for cooling the batteries.

7. The cooling structure for a construction machine, according to claim 1, wherein the batteries are installed at spaces for ventilating the cooling air along the flowing direction of the cooling air flowing in the ventilation passage for cooling the batteries.

8. The cooling structure for a construction machine, according to claim 1, wherein the batteries are installed at spaces for ventilating the cooling air along a direction perpendicular to the flowing direction of the cooling air flowing in the ventilation passage for cooling the batteries.

9. A cooling structure for a construction machine, the construction machine comprising:

an engine room including an engine, a radiator for cooling the engine, and a hydraulic pump; and a counterweight area including batteries, wherein: a ventilation passage for cooling the engine room and a ventilation passage for cooling the batteries are formed separately and independently; and an air exhaust sort of the ventilation passage for cooling the engine room and an air intake port of the ventilation passage for cooling the batteries are formed in different surfaces to each other, and wherein shelf plates are installed in the counterweight area in a multiple step manner, the batteries are fixed on the respective shelf plates, and spaces for ventilating cooling air are formed between the batteries and shelf plates above the batteries.

10. The cooling structure for a construction machine, according to claim 1, wherein the batteries are batteries selected from a group including lead batteries, lithium ion batteries, and nickel-hydrogen batteries.

11. The cooling structure for a construction machine, according to claim 5, wherein the different surfaces are mutually opposite side surfaces of the construction machine.

12. The cooling structure for a construction machine, according to claim 5, wherein a blower that generates the cooling air for the batteries is installed at a downstream portion of the flowing direction of the cooling air flowing in the ventilation passage for cooling the batteries.

13. The cooling structure for a construction machine, according to claim 5, wherein the batteries are batteries selected from a group including lead batteries, lithium ion batteries, and nickel-hydrogen batteries.

14. The cooling structure for a construction machine, according to claim 6, wherein the different surfaces are mutually opposite side surfaces of the construction machine.

15. The cooling structure for a construction machine, according to claim 6, wherein a blower that generates cooling air for the batteries is installed at a downstream portion of the flowing direction of the cooling air flowing in the ventilation passage for cooling the batteries.

16. The cooling structure for a construction machine, according to claim 6, wherein the batteries are batteries selected from a group including lead batteries, lithium ion batteries, and nickel-hydrogen batteries.

17. The cooling structure for a construction machine, according to claim 9, wherein the different surfaces are mutually opposite side surfaces of the construction machine.

18. The cooling structure for a construction machine, according to claim 9, wherein a blower that generates the cooling air for the batteries is installed at a downstream portion of the flowing direction of the cooling air flowing in the ventilation passage for cooling the batteries.

19. The cooling structure for a construction machine, according to claim 9, wherein the batteries are batteries selected from a group including lead batteries, lithium ion batteries, and nickel-hydrogen batteries.

* * * * *